(12) United States Patent
Neuhaeusler et al.

(10) Patent No.: US 12,454,263 B2
(45) Date of Patent: Oct. 28, 2025

(54) VEHICLE VARIANT INDEPENDENT LANE CENTERING CONTROL

(71) Applicant: Robert Bosch GmbH, Stuttgart (DE)

(72) Inventors: Marco Peter Andreas Neuhaeusler, Canton, MI (US); Johannes Helmut Blessing, Novi, MI (US); Andrew Hall, Detroit, MI (US); Nickolas Patrick Kreuscher, Canton, MI (US)

(73) Assignee: Robert Bosch GmbH, Stuttgart (DE)

( * ) Notice: Subject to any disclaimer, the term of this patent is extended or adjusted under 35 U.S.C. 154(b) by 137 days.

(21) Appl. No.: 18/361,404

(22) Filed: Jul. 28, 2023

(65) Prior Publication Data

US 2025/0033634 A1    Jan. 30, 2025

(51) Int. Cl.
*B60W 30/12* (2020.01)

(52) U.S. Cl.
CPC ......... *B60W 30/12* (2013.01); *B60W 2520/10* (2013.01); *B60W 2520/125* (2013.01); *B60W 2520/14* (2013.01)

(58) Field of Classification Search
CPC ............. B60W 30/12; B60W 2520/10; B60W 2520/125; B60W 2520/14
See application file for complete search history.

(56) References Cited

U.S. PATENT DOCUMENTS

| | | |
|---|---|---|
| 8,818,634 B2 | 8/2014 | Fujita |
| 9,150,246 B2 | 10/2015 | Lee et al. |
| 9,731,755 B1 | 8/2017 | Moshchuk et al. |
| 10,167,013 B2 | 1/2019 | Kunihiro et al. |
| 10,222,806 B2 | 3/2019 | Nakada et al. |
| 10,640,110 B2 | 5/2020 | Tatsukawa |
| 11,780,447 B2 * | 10/2023 | Wang ................... B60K 7/0007 701/36 |
| 2020/0086856 A1 * | 3/2020 | Park ..................... B60W 30/09 |
| 2020/0114959 A1 * | 4/2020 | Varga .................. B60W 40/114 |
| 2020/0148261 A1 * | 5/2020 | Varunjikar ......... B62D 15/0265 |
| 2020/0317198 A1 * | 10/2020 | Hashemi ............. B60W 40/068 |
| 2022/0169259 A1 * | 6/2022 | Wang .................... B60W 40/10 |

FOREIGN PATENT DOCUMENTS

| | | | | |
|---|---|---|---|---|
| CN | 109795502 A | * | 5/2019 | |
| CN | 109927700 A | * | 6/2019 | |
| CN | 116653635 A | * | 8/2023 | |
| JP | 2012060722 A | * | 3/2012 | |
| WO | WO-2018149501 A1 | * | 8/2018 | .......... B60W 30/045 |
| WO | WO-2020186443 A1 | * | 9/2020 | ........... B60K 7/0007 |

* cited by examiner

*Primary Examiner* — Joseph J Dallo
(74) *Attorney, Agent, or Firm* — Michael Best & Friedrich LLP

(57) ABSTRACT

Examples provide a system for performing lane centering control of a vehicle. The system includes a set of vehicle sensors configured to measure a speed of the vehicle, measure a yaw rate of the vehicle, and measure a lateral acceleration of the vehicle. The system also includes a lane centering controller configured to receive a requested lateral acceleration, determine a target lateral acceleration based on the requested lateral acceleration and the lateral acceleration, determine a target motor torque based on the target lateral acceleration, and determine whether a control override condition is met. In response to determining that the control override condition is not met, the lane centering controller controls a motor of the vehicle according to the target motor torque. The target motor torque is a motor torque necessary to achieve the target lateral acceleration.

15 Claims, 4 Drawing Sheets

VEHICLE VARIANT INDEPENDENT LANE CENTERING CONTROL

BACKGROUND

Embodiments, examples, and aspects described herein relate to, among other things, a system and method for lane centering control of a vehicle.

SUMMARY

Conventionally, in open-loop vehicle calibration, engineers calibrate lane centering control in vehicles using trajectory-based calibration. Based on a calculated trajectory, the electronic control unit ("ECU") of the vehicle determines a torque request, and sends the torque request to an electric power steering ("EPS") system of the vehicle. A controller of the EPS system determines a characteristic curve of the vehicle, and calculates a resulting motor torque based on the torque request and the characteristic curve. The characteristic curve is unique for every vehicle (or vehicle variant) and, therefore, needs to be tuned for every variant (e.g., summer tires, all-season tires, air suspension, dampers, etc.). The calibration engineer must change the calibration for every variant, which can be both time consuming and costly. Additionally, lane centering control is typically performed by controlling steering angle of the vehicle, and based on calibration lookup tables. Therefore, aspects disclosed herein provide, among other things, systems and methods for performing closed-loop vehicle variant independent lane centering control.

One example provides a system for performing lane centering control of a vehicle. The system includes a set of vehicle sensors, the set of vehicle sensors configured to: measure a speed of the vehicle and output a measured vehicle speed, measure a yaw rate of the vehicle and output a measured yaw rate, and measure a lateral acceleration of the vehicle and output a measured lateral acceleration. The system also includes a lane centering controller configured to: receive a requested lateral acceleration, determine a target lateral acceleration based on the requested lateral acceleration and the measured lateral acceleration, determine a target motor torque based on the target lateral acceleration, determine whether a control override condition is met, in response to determining that the control override condition is not met, control a motor according to the target motor torque, wherein the target motor torque is a motor torque necessary to achieve the target lateral acceleration.

In some aspects, the lane centering controller is configured to determine a lateral acceleration error based on a difference between the target lateral acceleration and the measured lateral acceleration.

In some aspects, the lane centering controller is configured to determine the target lateral acceleration and the target motor torque using a PID controller included in the lane centering controller and configured to: receive the lateral acceleration error, and determine the target motor torque using the lateral acceleration error.

In some aspects, the lane centering controller is further configured to, in response to determining that the control override condition is met, control motor torque to 0 Newton-meters (Nm).

In some aspects, the control override condition includes a determination by the lane centering controller that the vehicle is in understeer or oversteer.

In some aspects, the set of vehicle sensors are further configured to measure a torsion bar torque of the vehicle and output a measured torsion bar torque, and the control override condition includes a determination by the lane centering controller that the measured torsion bar torque exceeds a calibration threshold.

In some aspects, the system further includes a rack position controller configured to control the motor based on a steering rack position of the vehicle; wherein the lane centering controller is further configured to: in response to determining that at least one selected from the group consisting of the measured lateral acceleration and the measured yaw rate exceeds a corresponding threshold, limit a control of the motor by the rack position controller.

Another example provides a method for performing lane centering control of a vehicle including a set of sensors and a lane centering controller. The method includes measuring a speed of the vehicle and output a measured vehicle speed; measuring a yaw rate of the vehicle and output a measured yaw rate; measuring a lateral acceleration of the vehicle and output a measured lateral acceleration; receiving a requested lateral acceleration; determining a target lateral acceleration based on the requested lateral acceleration and the measured lateral acceleration; determining a target motor torque based on the target lateral acceleration; determining whether a control override condition is met; and in response to determining that the control override condition is not met, controlling a motor according to the target motor torque. The target motor torque is a motor torque necessary to achieve the target lateral acceleration.

In some aspects, the method further includes determining a lateral acceleration error based on a difference between the target lateral acceleration and the measured lateral acceleration.

In some aspects, determining the target lateral acceleration and the target motor torque includes receiving, with a PID controller, the lateral acceleration error, and determining, with the PID controller, the target motor torque using the lateral acceleration error.

In some aspects, the method further includes, in response to determining that the control override condition is met, controlling motor torque to 0 Newton-meters (Nm).

In some aspects, the control override condition includes a determination that the vehicle is in understeer or oversteer.

In some aspects, the method further includes measuring a torsion bar torque of the vehicle and outputting a measured torsion bar torque, wherein the control override condition includes a determination that the measured torsion bar torque exceeds a calibration threshold.

In some aspects, the method further includes controlling, with a rack position controller, the motor based on a steering rack position of the vehicle; and in response to determining that at least one selected from the group consisting of the measured lateral acceleration and the measured yaw rate exceeds a corresponding threshold, limiting a control of the motor by the rack position controller.

Another example provides a non-transitory computer-readable medium storing a program for performing lane centering control of a vehicle that. The program, when executed by an electronic processor in the vehicle, causes the electronic processor to: receive a requested lateral acceleration; determine a target lateral acceleration based on the requested lateral acceleration and a measured lateral acceleration; determine a target motor torque based on the target lateral acceleration; determine whether a control override condition is met; and in response to determining that the control override condition is not met, control a motor according to the target motor torque, wherein the target motor torque is a motor torque necessary to achieve the target lateral acceleration.

DETAILED DESCRIPTION

Figure 1:
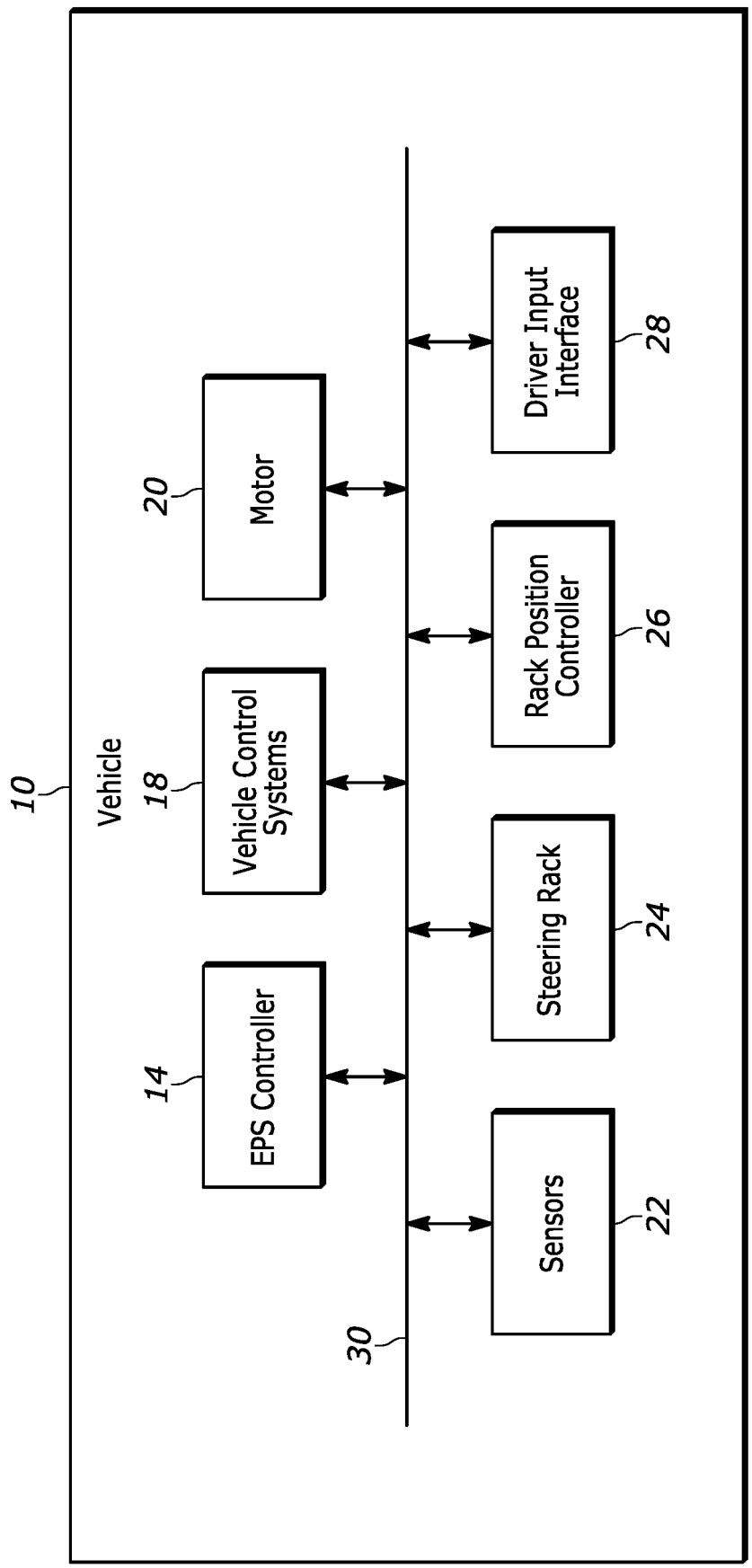
FIG. 1 schematically illustrates a vehicle, according to some aspects.

Before any aspects, features, or instances are explained in detail, it is to be understood that the aspects, features, or instances are not limited in their application to the details of construction and the arrangement of components set forth in the following description or illustrated in the following drawings. Other instances are possible and are capable of being practiced or of being carried out in various ways.

Also, it is to be understood that the phraseology and terminology used herein is for the purpose of description and should not be regarded as limiting. The terms "mounted," "connected" and "coupled" are used broadly and encompass both direct and indirect mounting, connecting, and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

It should also be understood that although certain drawings illustrate hardware and software located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations. To reiterate, those electronic processors and processing may be distributed.

For ease of description, some or all of the example systems presented herein are illustrated with a single exemplar of each of its component parts. Some examples may not describe or illustrate all components of the systems. Other instances may include more or fewer of each of the illustrated components, may combine some components, or may include additional or alternative components.

FIG. 1 schematically illustrates a vehicle 10, according to some aspects. In some instances, the vehicle 10 is an autonomous vehicle. The term "autonomous vehicle" is used in an inclusive way to refer to an autonomous or partially autonomous vehicle, which possesses varying degrees of automation (that is, the vehicle is configured to drive itself with limited, or in some cases no, input from a driver). The term "driver," as used herein, generally refers to an occupant of a vehicle, who operates the controls of the vehicle or provides control input to the vehicle to influence the operation of the vehicle. However, in some instances, the vehicle 10 is not an autonomous vehicle.

In the illustrated example, the vehicle 10 includes an EPS controller 14, vehicle control systems 18, a motor 20, a plurality of sensors 22 installed on the vehicle 10, a steering rack 24 for steering one or more wheels of the vehicle 10, a rack position controller 26, and a driver input interface 28. The components of the vehicle 10, along with other various modules and components are electrically and communicatively coupled to each other via direct connections or by or through one or more control or data buses (for example, the bus 30), which enable communication therebetween. The use of control and data buses for the interconnection between, and communication among, the various modules and components would be known to a person skilled in the art in view of the invention described herein. In some instances, the bus 30 is a controller area network (CAN) bus. In some instances, the bus 30 is an automotive Ethernet, a FlexRay™ communications bus, or another suitable bus. In some instances, some or all of the components of the vehicle 10 may be communicatively coupled using suitable wireless modalities (for example, Bluetooth™ or near field communication connections).

The EPS controller 14 (described in greater detail below with respect to FIG. 2) is implemented in an EPS system of the vehicle and communicates with vehicle control systems 18 and the sensors 22. The EPS controller 14 may receive sensor data from the sensors 22 and determine control commands for the vehicle 10. The EPS controller 14 transmits the control commands to, among other things, the vehicle control systems 18 to operate or assist in operating the vehicle 10 (for example, by generating braking signals, acceleration signals, steering signals). In some instances, the EPS controller 14 is part of one or more vehicle controllers that implement autonomous or partially autonomous control of the vehicle 10. The EPS controller 14 may be located in a suitable location or locations in the vehicle 10. The EPS controller 14 may otherwise be referred to herein as the steering controller 14 and/or the lane centering controller 14.

The vehicle control systems 18 may include controllers, actuators, and the like for controlling aspects of the operation of the vehicle 10 (for example, acceleration, braking, shifting gears, and the like). The vehicle control systems 18 communicate with the EPS controller 14 via the bus 30. The motor 20 may be an EPS motor 20 configured to receive a motor torque command from, for example, the EPS controller 14.

The sensors 22 measure one or more attributes of the vehicle 10 and the environment around the vehicle 10 and communicate information regarding those attributes to the other components of the vehicle 10 using, for example, messages transmitted on the bus 30. The sensors 22 may include, for example, sensors that detect accelerator pedal position and brake pedal position, wheel speed sensors, steering angle sensors, vehicle speed sensors, yaw, pitch, and roll sensors, Hall effect sensors, force sensors, torque sensors, rotor position sensors, acceleration sensors (e.g., forward/reverse acceleration sensors, lateral acceleration sensors, Z-axis acceleration sensors, etc.), image sensors (e.g., cameras), and vehicle proximity sensors (for example, ultrasonic). In some instances, the sensors 22 are similar to sensor sets used in an electronic stability control (ESC) system and similar vehicle control systems.

The rack position controller 26 is electrically connected to, among other components of the vehicle 10, the steering rack 24, the motor 20, and the driver input interface 28 for controlling the motor based on measured values associated with the steering rack 24 (e.g., rack position, rack speed, and requested rack position).

In some instances, the EPS controller 14 controls aspects of the vehicle 10 based on commands received from the driver input interface 28. The driver input interface 28 provides an interface between the components of the vehicle 10 and an occupant (for example, a driver) of the vehicle 10. The driver input interface 28 is configured to receive input from the driver (e.g., a braking input, a steering input, etc.), receive indications of vehicle status from the system's controllers (for example, the EPS controller 14), and provide information to the driver based on the received indications. The driver input interface 28 provides visual output, such as, for example, graphical indicators (for example, fixed or animated icons), lights, colors, text, images, combinations of the foregoing, and the like. The driver input interface 28 includes a suitable display mechanism for displaying the visual output, such as, for example, a liquid crystal display (LCD) touch screen, or an organic light-emitting diode (OLED) touch screen), or other suitable mechanisms. In some instances, the driver input interface 28 displays a graphical user interface (GUI) (for example, generated by the EPS controller 14 and presented on a display screen) that enables a driver or passenger to interact with the vehicle 10. The driver input interface 28 may also provide audio output to the driver via a chime, buzzer, speaker, or other suitable device included in the driver input interface 28 or separate from the driver input interface 28. In some instances, driver input interface 28 provides haptic outputs to the driver by vibrating one or more vehicle components (for example, the vehicle's steering wheel and the seats), for example, using a vibration motor. In some instances, the driver input interface 28 provides a combination of visual, audio, and haptic outputs.

Figure 2:
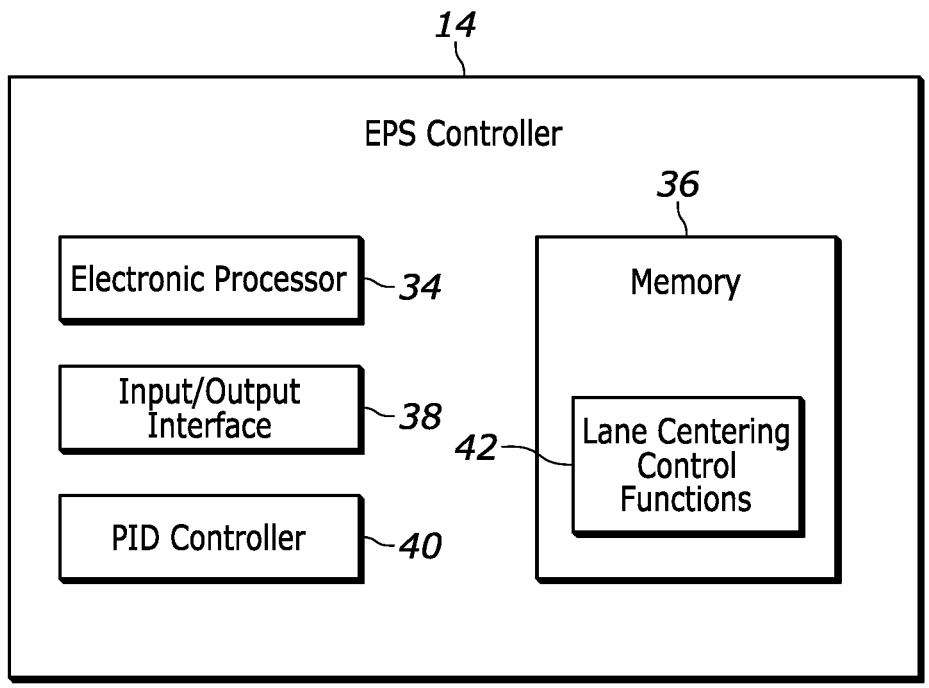
FIG. 2 schematically illustrates an electronic controller for a vehicle, according to some aspects.

FIG. 2 illustrates an example of the EPS controller 14, which includes an electronic processor 34 (for example, a microprocessor, application specific integrated circuit, etc.), a memory 36, an input/output interface 38, and a proportional-integral-derivative ("PID") controller 40. The memory 36 may be made up of one or more non-transitory computer-readable media and includes at least a program storage area and a data storage area. The program storage area and the data storage area can include combinations of different types of memory, such as read-only memory ("ROM"), random access memory ("RAM"), electrically erasable programmable read-only memory ("EEPROM"), flash memory, or other suitable memory devices. The electronic processor 34 is coupled to the memory 36 and the input/output interface 38. The electronic processor 34 sends and receives information (for example, from the memory 36 and/or the input/output interface 38) and processes the information by executing one or more software instructions or modules, capable of being stored in the memory 36, or another non-transitory computer readable medium. The software can include firmware, one or more applications, program data, filters, rules, one or more program modules, and other executable instructions.

The electronic processor 34 is configured to retrieve from the memory 36 and execute, among other things, software for performing methods as described herein. In the example illustrated, the memory 36 stores, among other things, lane centering control functions 42 for performing lane centering control of the vehicle 10. The input/output interface 38 transmits and receives information from devices external to the EPS controller 14 (for example, components of the vehicle 10 via the bus 30). It should be understood that the EPS controller 14 may include additional components than those illustrated in FIG. 2 and in various configurations. For example, in some examples, the EPS controller 14 includes multiple electronic processors 34, multiple memory modules 36, multiple input/output interfaces 38, or a combination thereof.

Figure 3:
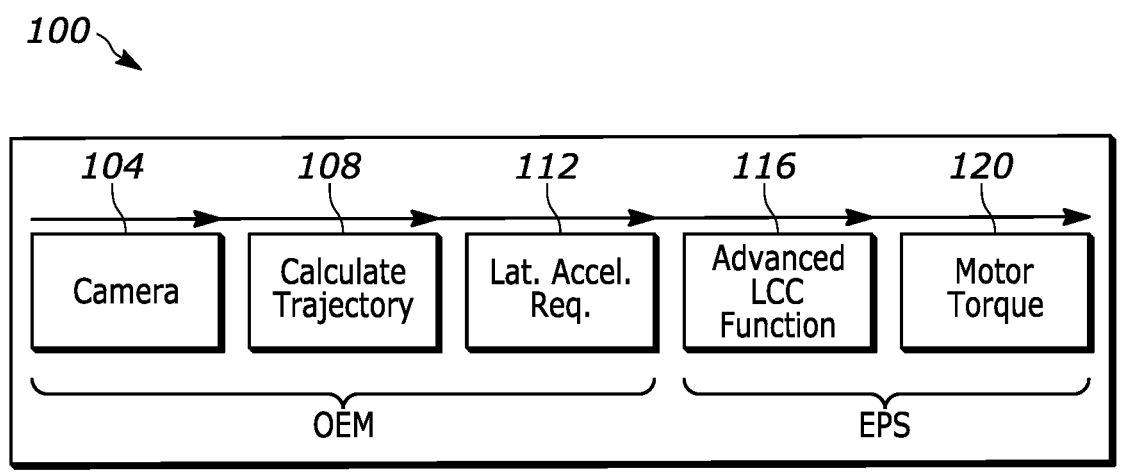
FIG. 3 illustrates a control diagram for performing lane centering control, according to some aspects.

FIG. 3 illustrates an example control method 100 for performing lane centering control, according to some aspects. Although the method 100 is described herein with a particular number of steps and in a particular order, it should be understand that the steps of the method 100 may include more or fewer steps, and the steps may be performed in a different order. Additionally, two or more steps of the method 100 may be performed in parallel with one another.

Some or all of the steps of the method 100 may be implemented by the EPS controller 14. However, one or more steps may be implemented by another electronic controller in the vehicle 10 (e.g., another controller included in the vehicle control systems 18). The method 100 includes receiving (e.g., with a controller included in the vehicle control systems 18) sensor data from the sensors 22 related to the environment surrounding the vehicle 10 (at block 104). For example, sensor data includes image data from one or more cameras mounted, for example, on a front portion of the vehicle 10. The method 100 includes determining (e.g., with a controller included in the vehicle control systems 18), based on the sensor data, a trajectory of the vehicle 10 (at block 108), and, based on the trajectory, determining a requested lateral acceleration for the vehicle 10 to achieve the trajectory (at block 112).

The method 100 includes performing, with the EPS controller 14, a closed-loop lane centering control ("LCC") function for controlling a lateral acceleration of the vehicle 10 based, at least in part, on the requested lateral acceleration (at block 116). The LCC function will be described in greater detail below with respect to FIG. 4. The method 100 further includes controlling, with the EPS controller 14, a torque of the motor 20 according to the LCC function (at block 120).

Figure 4:
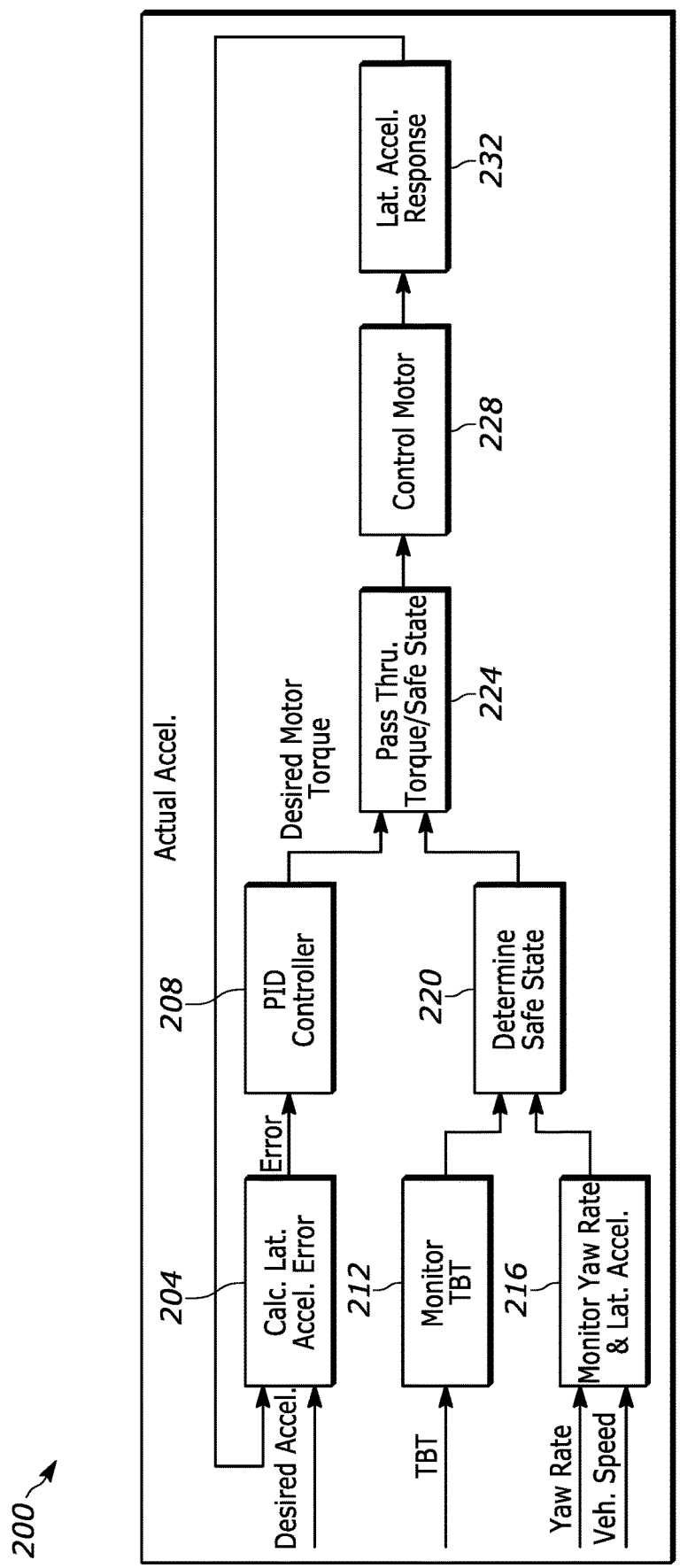
FIG. 4 illustrates a flowchart for performing lane centering control, according to some aspects.

FIG. 4 illustrates an example control method 200, implemented by the EPS controller 14, for performing a closed-loop LCC function, according to some aspects. Although the method 200 is described herein with a particular number of steps and in a particular order, it should be understand that the steps of the method 200 may include more or fewer steps, and the steps may be performed in a different order. Additionally, two or more steps of the method 200 may be performed in parallel with one another.

The method 200 includes determining a lateral acceleration error based on a difference between a measured, or actual, lateral acceleration of the vehicle 10 and the requested lateral acceleration determined at block 112 of the method 100 (at block 204). In some instances, the measured lateral acceleration is received by the EPS controller 14 directly from the sensors 22 (e.g., from a dedicated lateral acceleration sensor). However, in some instances, the EPS controller 14 or another controller calculates the measured lateral acceleration using other sensor data (e.g., from a measured yaw rate measured by a yaw rate sensor).

The lateral acceleration error is received by the PID controller 40, and the PID controller 40 determines a target motor torque based on the lateral acceleration error (at block 208). The PID controller 40 calculates the target motor torque by, for example, calculating target lateral acceleration based on the lateral acceleration error. The target lateral acceleration is a lateral acceleration of the vehicle 10 necessary to reduce the lateral acceleration error, and the target motor torque is a motor torque necessary to achieve the target lateral acceleration.

The method 200 also includes monitoring a measured torsion bar torque of a torsion bar included in the vehicle 10 to determine whether the measured torsion bar torque exceeds a calibration threshold (at block 212). In order to detect a potential oversteer or understeer event, the EPS controller 14 also monitors the measured yaw rate and measured lateral acceleration of the vehicle 10. For example, the EPS controller 14 may determine that the vehicle 10 is in oversteer or understeer based on a determination that the measured lateral acceleration is approximately 0 meters per second squared ($m/s^2$) while an absolute value of the measured yaw rate is above zero degrees per second.

Based on the measured torsion bar torque, the measured yaw rate, and the measured lateral acceleration, the EPS controller 14 determines whether at least one override condition is met (at block 220). For example, the at least one override condition may include the measured torsion bar torque exceeding the calibration threshold. The at least one override condition may also include a determination by the EPS controller 14 that the vehicle 10 is in oversteer or understeer.

The method 200 includes determining whether to pass through, to the motor 20, a target motor torque command for controlling the motor 20 according to the target motor torque or a motor torque override command for controlling the motor to 0 Newton-meters ("Nm") (at block 224). The EPS controller 14 determines whether to pass through the target motor torque command or the motor torque override command based on a determination of whether at least one override condition is met (at block 220). For example, in response to determining that at least one override condition is met, the EPS controller 14 passes the motor torque override command to the motor 20 (at block 228). In response to determining that no override condition is met, the EPS controller 14 passes the target motor torque command to the motor 20 (at block 228).

The EPS controller 14 monitors the lateral acceleration response of the vehicle 10 (at block 232), and the lateral acceleration response is used as the measured lateral acceleration input for a subsequent iteration of the closed-loop LCC function (at block 204 of the method 200).

Figure 5:
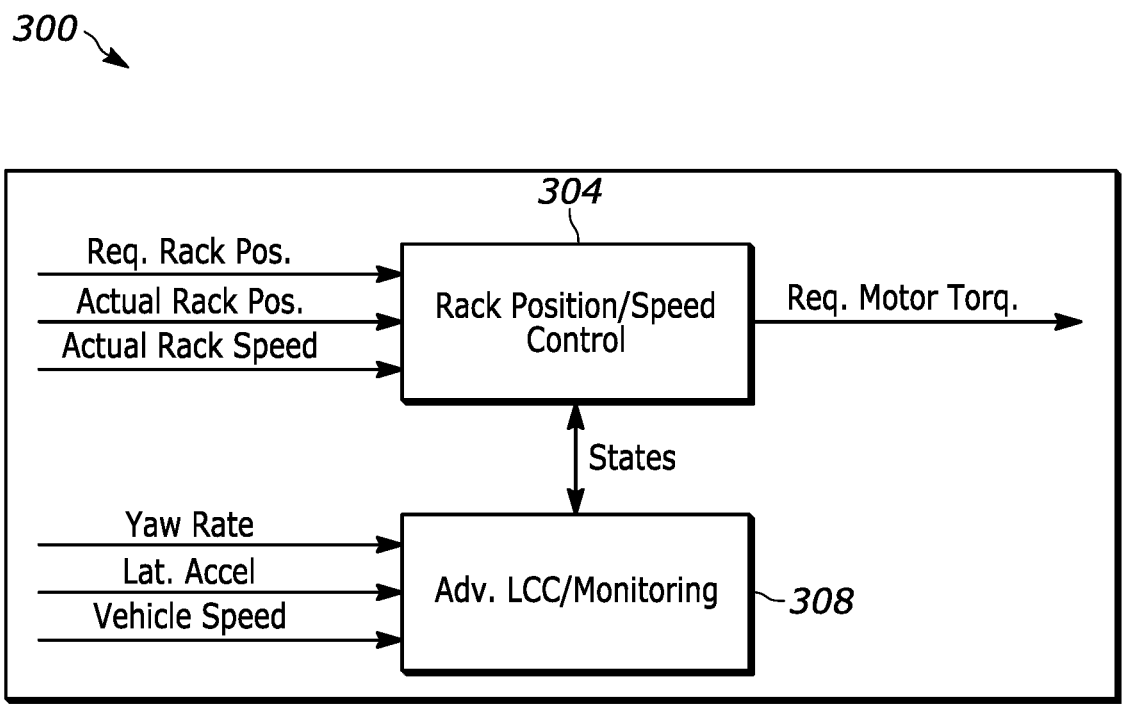
FIG. 5 illustrates a flowchart for controlling a rack position controller, according to some aspects.

FIG. 5 illustrates an example control method 300 for performing rack position control, according to some aspects. Although the method 300 is described herein with a particular number of steps and in a particular order, it should be understand that the steps of the method 200 may include more or fewer steps, and the steps may be performed in a different order. Additionally, two or more steps of the method 300 may be performed in parallel with one another. Some or all of the steps of the method 300 may be implemented by the EPS controller 14. However, one or more steps of the method 300 may be implemented using the rack position controller 26.

The method 300 includes performing rack position and rack speed control of the vehicle 10 using the rack position controller 26 (at block 204). For example, the rack position controller 26 receives a requested rack position (e.g., requested by the user through the driver input interface 28), a measured or "actual" rack position of the steering rack 24 (e.g., measured by a rack position sensor included in the sensors 22), and a measured or "actual" rack speed of the steering rack 24. Based on the requested rack position, the measured rack position, and the measured rack speed, the rack position controller 26 determines a motor torque request, transmitted to the motor 20, for achieving the requested rack position.

The method 300 also includes monitoring, with the EPS controller 14 (e.g., using the LCC functions 42), the measured yaw rate, the measured lateral acceleration, and the measured vehicle speed. When the measured yaw rate exceeds a yaw rate threshold, the measured lateral acceleration exceeds a lateral acceleration threshold, and/or the vehicle speed exceeds a vehicle speed threshold, the EPS controller 14 transmits a rack position control ("RPC") override command to the rack position controller 26. The RPC override command limits or otherwise deactivates a control of the motor 20 by the rack position controller 26. For example, the RPC override command limits an amount of motor torque that the rack position controller 26 may request from the motor 20.

Thus, aspects herein provide, among other things, systems and methods for vehicle variant independent lane centering control.

What is claimed is:

1. A system for performing lane centering control of a vehicle, the system comprising:
   a set of vehicle sensors, the set of vehicle sensors configured to:
   measure a speed of the vehicle and output a measured vehicle speed,
   measure a yaw rate of the vehicle and output a measured yaw rate, and
   measure a lateral acceleration of the vehicle and output a measured lateral acceleration; and
   a lane centering controller configured to:
   receive a requested lateral acceleration,
   determine a target lateral acceleration based on the requested lateral acceleration and the measured lateral acceleration,
   determine a target motor torque based on the target lateral acceleration,
   determine whether a control override condition is met, wherein the override condition is a determination by the lane centering controller that the measured torsion bar torque exceeds a calibration threshold, and
   in response to determining that the control override condition is not met, control a motor according to the target motor torque, wherein the target motor torque is a motor torque necessary to achieve the target lateral acceleration.

2. The system of claim 1, wherein the lane centering controller is configured to determine a lateral acceleration error based on a difference between the target lateral acceleration and the measured lateral acceleration.

3. The system of claim 2, wherein the lane centering controller is configured to determine the target lateral acceleration and the target motor torque using a PID controller included in the lane centering controller and configured to:
receive the lateral acceleration error,
determine the target motor torque using the lateral acceleration error.

4. The system of claim 1, wherein the lane centering controller is further configured to, in response to determining that the control override condition is met, control motor torque to 0 Newton-meters (Nm).

5. The system of claim 4, wherein the control override condition includes a determination by the lane centering controller that the vehicle is in understeer or oversteer.

6. The system of claim 1, wherein the set of vehicle sensors are further configured to measure a torsion bar torque of the vehicle and output a measured torsion bar torque.

7. The system of claim 1, further comprising:
a rack position controller configured to control the motor based on a steering rack position of the vehicle;
wherein the lane centering controller is further configured to:
in response to determining that at least one selected from the group consisting of the measured lateral acceleration and the measured yaw rate exceeds a corresponding threshold, limit a control of the motor by the rack position controller.

8. A method for performing lane centering control of a vehicle including a set of sensors and a lane centering controller, the method comprising:
measuring a speed of the vehicle and output a measured vehicle speed;
measuring a yaw rate of the vehicle and output a measured yaw rate;
measuring a lateral acceleration of the vehicle and output a measured lateral acceleration;
receive a requested lateral acceleration,
determining a target lateral acceleration based on the requested lateral acceleration and the measured lateral acceleration;
determining a target motor torque based on the target lateral acceleration;
determining whether a control override condition is met, wherein the override condition is a determination by the lane centering controller that the measured torsion bar torque exceeds a calibration threshold; and
in response to determining that the control override condition is not met, controlling a motor according to the target motor torque, wherein the target motor torque is a motor torque necessary to achieve the target lateral acceleration.

9. The method of claim 8, further comprising: determining a lateral acceleration error based on a difference between the target lateral acceleration and the measured lateral acceleration.

10. The method of claim 9, wherein determining the target lateral acceleration and the target motor torque includes:
receiving, with a PID controller, the lateral acceleration error, and
determining, with the PID controller, the target motor torque using the lateral acceleration error.

11. The method of claim 8, further comprising:
in response to determining that the control override condition is met, controlling motor torque to 0 Newton-meters (Nm).

12. The method of claim 11, wherein
the control override condition includes a determination that the vehicle is in understeer or oversteer.

13. The method of claim 8, further comprising:
measuring a torsion bar torque of the vehicle and outputting a measured torsion bar torque.

14. The method of claim 8, further comprising:
controlling, with a rack position controller, the motor based on a steering rack position of the vehicle; and
in response to determining that at least one selected from the group consisting of the measured lateral acceleration and the measured yaw rate exceeds a corresponding threshold, limiting a control of the motor by the rack position controller.

15. A non-transitory computer-readable medium storing a program for performing lane centering control of a vehicle that, when executed by an electronic processor in the vehicle, causes the electronic processor to:
receive a requested lateral acceleration,
determine a target lateral acceleration based on the requested lateral acceleration and a measured lateral acceleration;
determine a target motor torque based on the target lateral acceleration;
determine whether a control override condition is met, wherein the override condition is a determination by the lane centering controller that the measured torsion bar torque exceeds a calibration threshold; and
in response to determining that the control override condition is not met, control a motor according to the target motor torque, wherein the target motor torque is a motor torque necessary to achieve the target lateral acceleration.

* * * * *